(12) United States Patent
Schirle et al.

(10) Patent No.: US 7,155,904 B2
(45) Date of Patent: Jan. 2, 2007

(54) HYDRODYNAMIC CONVERTER

(75) Inventors: Hans Schirle, Stimpfach (DE); Georg Wahl, Crallsheim (DE); Andreas Basteck, Lörrach (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 11/072,983

(22) Filed: Mar. 4, 2005

(65) Prior Publication Data

US 2005/0235636 A1 Oct. 27, 2005

(30) Foreign Application Priority Data

Mar. 6, 2004 (DE) .................. 10 2004 011 03

(51) Int. Cl.
*F16H 41/04* (2006.01)
*F16D 33/04* (2006.01)

(52) U.S. Cl. .......................... 60/361; 60/330
(58) Field of Classification Search ............... 60/361, 60/330; 416/180, 197

See application file for complete search history.

(56) References Cited

U.S. PATENT DOCUMENTS

| | | | | |
|---|---|---|---|---|
| 2,578,876 A | * | 12/1951 | Banner | 60/361 |
| 3,848,409 A | * | 11/1974 | Waclawek | 60/361 |
| 3,888,082 A | | 6/1975 | Haide | 60/361 |
| 4,047,383 A | * | 9/1977 | Johnson et al. | 60/361 |

FOREIGN PATENT DOCUMENTS

| WO | WO 02/14706 A2 | 8/2000 |
|---|---|---|
| WO | WO 200214706 A2 * | 2/2002 |

OTHER PUBLICATIONS

Article: Kraftfahr Technisches Taschenbuch, by Bosch, pp. 554-559, 1995.
Article: VDI—Richtlinien, Hydrodynamische Leistungsübertragung, VDI 2153, Alle Rechte vorbehalten © Verein Deutscher Ingenieure, Düsseldorf, Hydrodynamic Power Transmission (Definitions-Designs-Mode of Action), Apr. 1994, pp. 44.

* cited by examiner

*Primary Examiner*—Thomas E. Lazo
(74) *Attorney, Agent, or Firm*—Ohlandt, Greeley, Ruggiero & Perle, L.L.P.

(57) ABSTRACT

A hydrodynamic converter is provided having a pump wheel, which is flowed through in operation from the inside to the outside; a turbine wheel, which is flowed through in operation from the outside to the inside; guide blades between the pump wheel and the turbine wheel; and guide blades between the turbine wheel and the pump wheel. The converter can have a speed ratio of between the speed $n_T$ of the turbine wheel and the speed $n_P$ of the pump wheel of between 1.2 and 4 at approximately even or falling $\lambda$ progress. The converter can also have different speed ratios between pump and turbine, which can be realized with the ratio R/r equal to or larger than 1.

19 Claims, 2 Drawing Sheets

HYDRODYNAMIC CONVERTER

RELATED APPLICATIONS

This application claims priority in German Application No. DE 10 2004 011 033.6, filed on Mar. 6, 2004, the disclosure of which is incorporated herein by reference.

BACKGROUND OF THE INVENTION

1. Field of the Invention

The invention relates to a hydrodynamic converter with a pump wheel, a turbine wheel and/or with guide blades.

2. Description of the Related Art

Hydrodynamic converters have long been known, see for example WO 02/14 706 A2 (=D1), U.S. Pat. No. 3,888,082 (=D2).

Converters of this kind are usually interposed between an engine and a work machine. Their application in motor vehicles is very common.

An important quantity is the torque $M_T$ which can be delivered by the turbine of the converter to the work machine. It is influenced by the torque $M_P$ of the pump, and also by the speed ratio of the turbine to the pump, $v=n_T/n_P$. The speed ratio is at 0.95 to 0.98 when using hydrodynamic converters in motor vehicles (cf. "Kraftfahrtechnisches Taschenbuch" (Pocket book on automotive technology), Bosch, $22^{nd}$ edition (=D3), page 558, left column).

The most important advantages of a hydrodynamic converter are the infinite variability in the change of speed and torque, in the oscillation dampening and the reduction of torque peaks. In practice, they are only operated in conjunction with mechanical multi-step transmissions (cf. D3). It is stated there on page 557, right column, that hydrodynamic converters can only be operated economically in conjunction with mechanical multi-step transmissions because permanent operation with high slip is only possible within limits with respect to efficiency.

There are a large number of different designs of converters. Pump and turbine can thus rotate in the same direction. The pump wheel and the turbine wheel (when seen in an axial sectional view) can be arranged on one and the same side of the flow circulation. They can also be situated opposite of each other.

Furthermore, pump wheel and turbine wheel can rotate in different directions, with a reversing guide wheel between pump wheel and turbine wheel.

Guide wheels can be adjustable or non-adjustable and can be configured in different ways.

The known converter designs have not been satisfactory in all cases. This applies especially concerning the need for space, and the overall costs for the drive train.

SUMMARY OF THE INVENTION

The invention is therefore based on the object of providing a converter of the kind mentioned above in such a way that it assumes the function of a transmission so that the transmission can be omitted.

The advantageous features of the present invention include allowing a choice of a speed ratio, which is clearly above 1 (in the region of maximum efficiency), from the large number of constructional possibilities. A prototype of an exemplary embodiment of the present invention achieved a speed ratio of 1.85. Generally, values of between 1.2 and 3 have been found to be advantageous.

It is further advantageous to place the outlet edge of the pump wheel at a larger length or radius than the inlet edge of the turbine wheel.

It is further advantageous to provide adjustable guide blades between the turbine wheel and the pump wheel.

The inventors have chosen an unusual path. It is known that converters with a speed ratio of over 1 tend to have a more adverse efficiency than converters of conventional design with a speed ratio of 1 or less. A converter according to an exemplary embodiment of the present invention described herein, results in little or no relevant deterioration in the efficiency as compared with conventional converters with a smaller speed ratio.

In one aspect, a hydrodynamic converter having a rotational axis is provided, which comprises a pump wheel, a turbine wheel, and first and second guide blades. The pump wheel has a pump outlet edge and allows flow of a medium therethrough. The turbine wheel is in fluid communication with the pump wheel and allows flow of the medium therethrough. The turbine wheel has a turbine inlet edge. The first guide blades are positioned between the pump wheel and the turbine wheel along a flow-path of the medium. The second guide blades are positioned between the turbine wheel and the pump wheel along the flow-path. A speed ratio for a speed of the turbine wheel with respect to a speed of the pump wheel is above 1. An input power of the pump wheel is constant or decreasing at rising turbine speed and constant pump speed. The pump outlet edge is positioned along a radius R. The turbine inlet edge is positioned along a radius r. The radius R is between 2 and 8 times the radius r.

In another aspect, a hydrodynamic converter having a rotational axis is provided, which comprises a pump wheel having a pump outlet edge and allowing flow of a medium therethrough in a direction away from the rotational axis; a turbine wheel in fluid communication with the pump wheel and allowing flow of the medium therethrough in a direction toward the rotational axis, with the turbine wheel having a turbine inlet edge; first guide blades positioned between the pump wheel and the turbine wheel along a flow-path of the medium; second guide blades positioned between the turbine wheel and the pump wheel along the flow-path; and third guide blades positioned between the turbine wheel and the pump wheel along the flow-path, with the third guide blades being adjustable. A speed ratio for a speed of the turbine wheel with respect to a speed of the pump wheel is above 1. An input power of the pump wheel is constant or decreasing at rising turbine speed and constant pump speed. The pump outlet edge is positioned along a radius R. The turbine inlet edge is positioned along a radius r. The ratio of the radius R to the radius r is above 1.

In another aspect, a method of delivering torque to a work machine is provided, which comprises: operably connecting a hydrodynamic converter having a rotational axis to the work machine; flowing a medium through the hydrodynamic converter thereby passing the medium through a pump wheel in a direction away from the rotational axis and passing the medium through a turbine wheel in a direction toward the rotational axis; operating the hydrodynamic converter with a speed ratio above 1 for a speed of the turbine wheel with respect to a speed of the pump wheel; providing an input power of the pump wheel that is constant or decreasing at rising turbine speed and constant pump speed; and positioning a pump outlet at a distance R from the rotational axis and a turbine inlet at a distance r from the rotational axis, wherein the distance R is between 2 and 8 times the distance r.

The speed ratio can be between 1.2 and 4. The flow of medium through the pump wheel may be in a direction away from the rotational axis and the flow of medium through the turbine wheel can be in a direction toward the rotational axis. The pump wheel as a pump inlet edge that can be along a radius that is larger than radius r of the turbine inlet edge. The hydrodynamic converter can also have third guide blades positioned between the turbine wheel and the pump wheel along the flow-path. The third guide blades may be adjustable.

The hydrodynamic converter may also have a radially extending shaft operably connected to the third guide blades and allowing for adjustment of the third guide blades. The radially extending shaft can be manipulatable from outside of the hydrodynamic converter. The radially extending shaft can also be in driving connection with a drive shaft extending coaxially to the rotational axis of the hydrodynamic converter.

The third guide blades may be arranged in the flow-path extending parallel to the rotational axis of the hydrodynamic converter. The first guide blades can be arranged in the flow-path extending parallel to the rotational axis of the hydrodynamic converter. The third guide blades may be closer to the rotational axis than the first guide blades. The second guide blades may be arranged in the flow-path extending parallel to the rotational axis of the hydrodynamic converter.

The method may further comprise positioning first guide blades between the pump wheel and the turbine wheel along a flow-path of the medium that is parallel to the rotational axis; positioning second guide blades between the turbine wheel and the pump wheel along the flow-path that is parallel to the rotational axis; and operating the hydrodynamic converter with the speed ratio between 1.2 and 4.

BRIEF DESCRIPTION OF THE DRAWINGS

The invention and the state of the art are explained below in closer detail by reference to the enclosed drawing, wherein.

DESCRIPTION OF THE INVENTION

Figure 1:
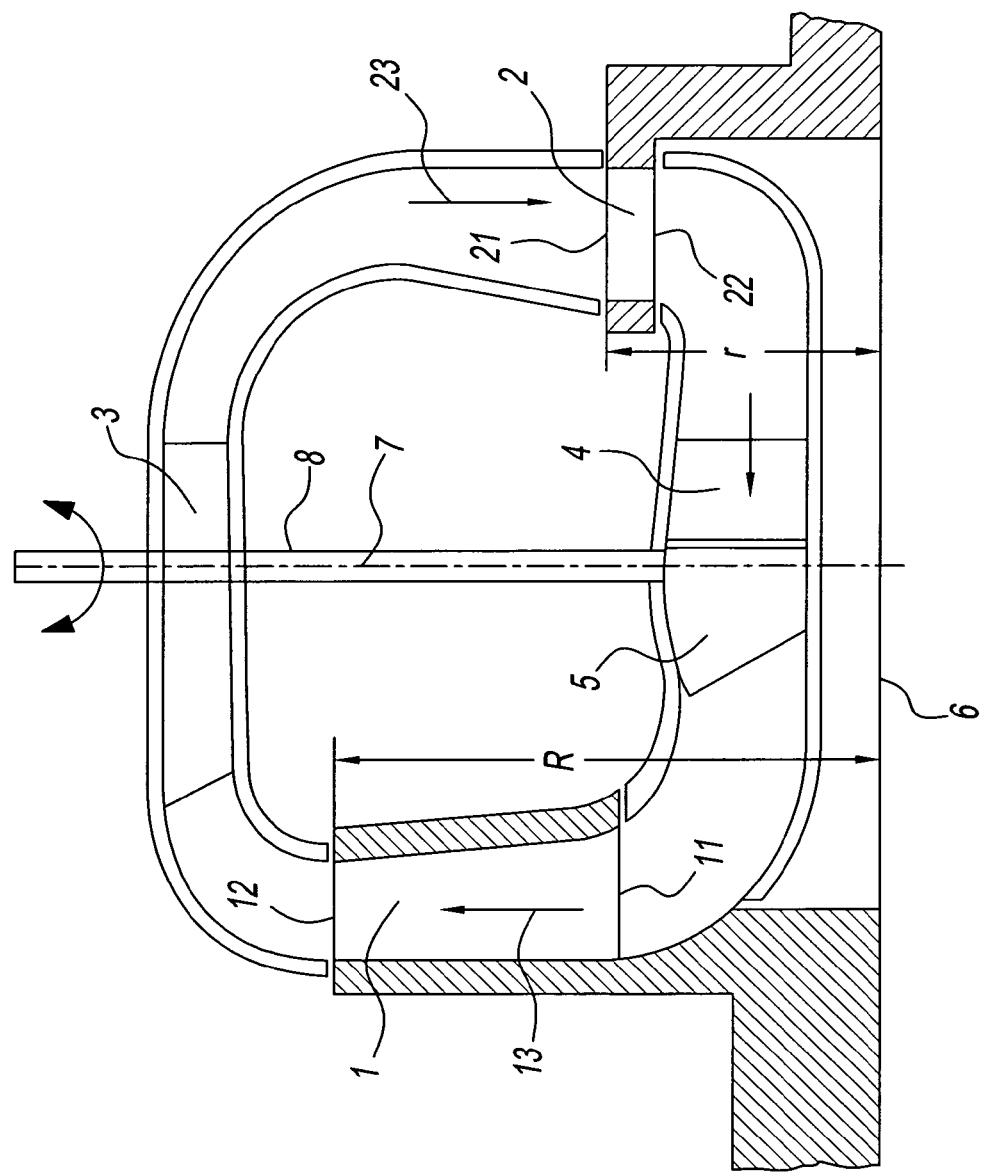
FIG. 1 shows a converter according to an exemplary embodiment of the invention in a schematic representation in an axial sectional view.

Referring to FIG. 1, a converter is shown having a pump wheel 1 and a turbine wheel 2. Fixed guide blades 3 are arranged between the pump wheel 1 and the turbine wheel 2.

Fixed guide blades 4 and adjustable guide blades 5 are also arranged between turbine wheel 2 and the pump wheel 1.

Pump wheel 1 and turbine wheel 2 are situated on either side of a plane 7, which is perpendicular to the longitudinal, rotational or machine axis 6. During operation, flow of the medium occurs in the pump wheel 1 from the inside to the outside as shown by arrow 13, i.e., in a direction away from the longitudinal axis 6. Also, during operation, flow of the medium through the turbine wheel 2 occurs from the outside to the inside as shown by arrow 23, i.e., in a direction toward the longitudinal axis 6.

Pump wheel 1 comprises an inlet edge 11 and an outlet edge 12. Turbine wheel 2 comprises an inlet edge 21 and an outlet edge 22.

The outlet edge 12 of the pump wheel 1 lies on the length or radius R (or is a distance R from the machine axis). The inlet edge 21 of the turbine wheel lies on the length or radius r (or is a distance r from the machine axis). The ratio of R to r is clearly above 1. It can be between 1.2 to 6, and is shown at 2.

One can see an adjusting shaft 8. It acts on the blades of the adjustable crown of guide blades 5 and lies in the plane 7. The adjusting shaft 8 can be manipulated from outside of the converter.

The adjustment of the adjustable guide blades 5 could also occur from the inside, such as, for example, by an adjusting shaft extending to the drive shaft of the converter which is not shown here, which adjusting shaft acts on the adjusting blades via a right-angle gear drive (not shown).

The illustrated configuration has proven to be especially advantageous. The guide blades 4 and the adjusting blades 5 are situated in a flow section or path of the circulation of the medium, which extends substantially parallel to the converter axis 6 and close to the same. The blades of the pump wheel 1 and the blades of the turbine wheel 2 are situated on either side of the plane 7, which is perpendicular to the axis 6. The guide blades 3 also extend in a flow section or path, which is parallel to the converter axis 6, but radially outside thereof.

Notice should also be taken of the ratio between the two radii R and r. It is preferably substantially larger than 1. It more preferably has a value of higher than 1.5 and can assume a value of 8 or more. The inlet edge 11 of the pump wheel 1 can lie along a length or radius (or be a distance from the converter axis 6) that is larger than the radius r of the inlet edge 21 of the turbine wheel 2.

Figure 2:
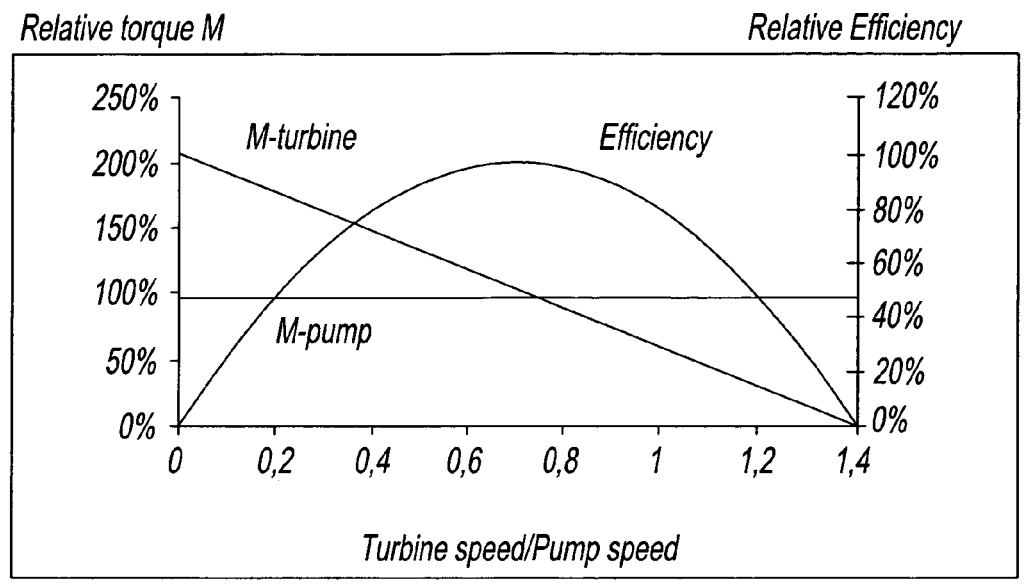
FIG. 2 shows a typical characteristic diagram of a conventional converter.
Figure 3:
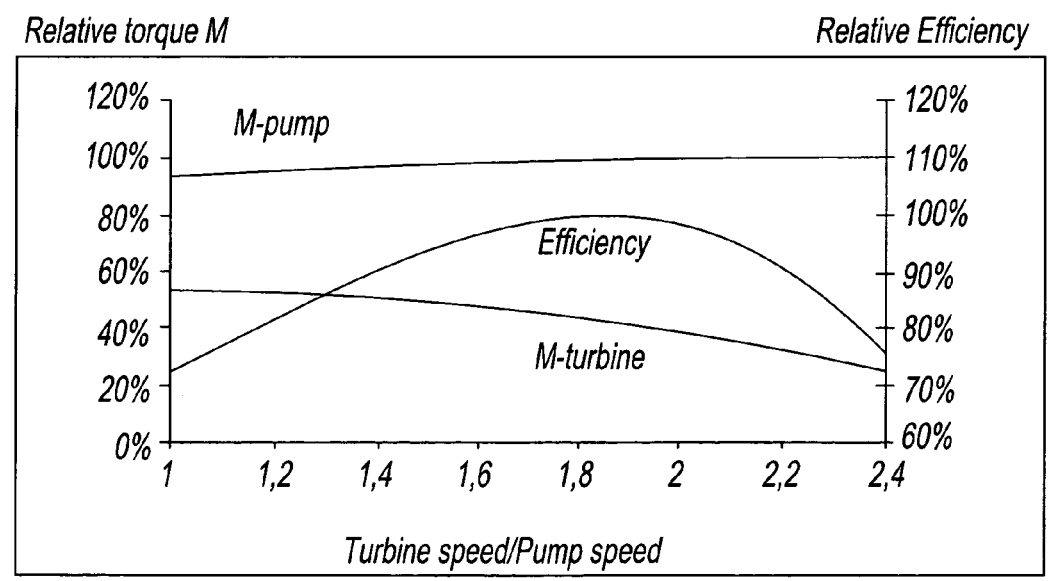
FIG. 3 shows the curve of the driving torque, the turbine torque and the efficiency over the speed ratio of a converter in accordance with the exemplary embodiment of the present invention.

FIG. 2 shows the progress of turbine torque $M_T$ as well as the progress of driving torque $M_P$ and the efficiency η, each entered over the speed ratio v (=turbine speed/pump speed). It can be seen that $\eta_{max}$ lies in the present case at a speed ratio of 1.85. According to the state of the art, the speed ratio at $\eta_{max}$ is smaller than 1 or approximately 1.

The advantages of the converter in accordance with the present invention include, but are not limited to, the following: a mechanical transmission can be omitted; a frequency converter can be omitted; the power density is high; the converter requires little space; the converter is not susceptible to malfunctions due to the lack of a mechanical transmission and due to the low number of components, but instead is reliable and has a long service life; and different speed ratios between the pump and the turbine can be realized with the ratio R/r equal to or larger than one.

A further possibility also exists for influencing the speed ratio with the choice of certain blade geometries for the pump wheel and the turbine wheel.

In a hydrodynamic converter of the present invention, the absorption power of the pump wheel at constant pump speed and at rising turbine speed will remain constant or nearly constant or drop slightly.

The present invention having been thus described with particular reference to the preferred forms thereof, it will be obvious that various changes and modifications may be made therein without departing from the spirit and scope of the present invention as defined in the appended claims.

What is claimed is:

1. A hydrodynamic converter having a rotational axis, the converter comprising:
   a pump wheel having a pump outlet edge and allowing flow of a medium therethrough;
   a turbine wheel in fluid communication with the pump wheel and allowing flow of the medium therethrough, the turbine wheel having a turbine inlet edge;
   first guide blades positioned between the pump wheel and the turbine wheel along a flow-path of the medium;
   second guide blades positioned between the turbine wheel and the pump wheel along the flow-path;
   a speed ratio for a speed of the turbine wheel with respect to a speed of the pump wheel of above 1;
   an input power of the pump wheel being constant or decreasing at rising turbine speed and constant pump speed; and
   the pump outlet edge being positioned along a radius R, the turbine inlet edge being positioned along a radius r, and the radius R being between 2 and 8 times radius r.

2. The hydrodynamic converter of claim 1, wherein the speed ratio is between 1.2 and 4.

3. The hydrodynamic converter of claim 2, wherein the pump wheel has a pump inlet edge along a radius that is larger than radius r of the turbine inlet edge.

4. The hydrodynamic converter of claim 2, further comprising third guide blades positioned between the turbine wheel and the pump wheel along the flow-path, wherein the third guide blades are adjustable.

5. The hydrodynamic converter of claim 4, further comprising a radially extending shaft operably connected to the third guide blades and allowing for adjustment of the third guide blades.

6. The hydrodynamic converter of claim 5, wherein the radially extending shaft is manipulatable from outside of the hydrodynamic converter.

7. The hydrodynamic converter of claim 5, wherein the radially extending shaft is in driving connection with a drive shaft extending coaxially to the rotational axis of the hydrodynamic converter.

8. The hydrodynamic converter of claim 4, wherein the third guide blades are arranged in the flow-path extending parallel to the rotational axis of the hydrodynamic converter.

9. The hydrodynamic converter of claim 8, wherein the first guide blades are arranged in the flow-path extending parallel to the rotational axis of the hydrodynamic converter.

10. The hydrodynamic converter of claim 9, wherein the third guide blades are closer to the rotational axis than the first guide blades.

11. The hydrodynamic converter of claim 1, wherein the flow of medium through the pump wheel is in a direction away from the rotational axis and wherein the flow of medium through the turbine wheel is in a direction toward the rotational axis.

12. The hydrodynamic converter of claim 1, wherein the second guide blades are arranged in the flow-path extending parallel to the rotational axis of the hydrodynamic converter.

13. A hydrodynamic converter having a rotational axis, the converter comprising:
   a pump wheel having a pump outlet edge and allowing flow of a medium therethrough in a direction away from the rotational axis;
   a turbine wheel in fluid communication with the pump wheel and allowing flow of the medium therethrough in a direction toward the rotational axis, the turbine wheel having a turbine inlet edge;
   first guide blades positioned between the pump wheel and the turbine wheel along a flow-path of the medium;
   second guide blades positioned between the turbine wheel and the pump wheel along the flow-path;
   third guide blades positioned between the turbine wheel and the pump wheel along the flow-path, the third guide blades being adjustable;
   a speed ratio for a speed of the turbine wheel with respect to a speed of the pump wheel of between 1.2 and 4;
   an input power of the pump wheel being constant or decreasing at rising turbine speed and constant pump speed; and
   the pump outlet edge being positioned along a radius R, the turbine inlet edge being positioned along a radius r, and a ratio of the radius R to the radius r is between 2 and 8.

14. A hydrodynamic converter having a rotational axis, the converter comprising:
   a pump wheel having a pump outlet edge and allowing flow of a medium therethrough in a direction away from the rotational axis;
   a turbine wheel in fluid communication with the pump wheel and allowing flow of the medium therethrough in a direction toward the rotational axis, the turbine wheel having a turbine inlet edge;
   first guide blades positioned between the pump wheel and the turbine wheel along a flow-path of the medium;
   second guide blades positioned between the turbine wheel and the pump wheel along the flow-path;
   third guide blades positioned between the turbine wheel and the pump wheel along the flow-path, the third guide blades being adjustable;
   a speed ratio for a speed of the turbine wheel with respect to a speed of the pump wheel of between 1.2 and 4;
   an input power of the pump wheel being constant or decreasing at rising turbine speed and constant pump speed; and
   the pump outlet edge being positioned along a radius R, the turbine inlet edge being positioned along a radius r, and the ratio of the radius R to the radius r is between 2 and 8, and wherein the pump wheel has a pump inlet edge along a radius that is larger than radius r of the turbine inlet edge.

15. A hydrodynamic converter having a rotational axis, the converter comprising:
   a pump wheel having a pump outlet edge and allowing flow of a medium therethrough in a direction away from the rotational axis;
   a turbine wheel in fluid communication with the pump wheel and allowing flow of the medium therethrough in a direction toward the rotational axis, the turbine wheel having a turbine inlet edge;
   first guide blades positioned between the pump wheel and the turbine wheel along a flow-path of the medium;
   second guide blades positioned between the turbine wheel and the pump wheel along the flow-path;
   third guide blades positioned between the turbine wheel and the pump wheel along the flow-path, the third guide blades being adjustable;
   a speed ratio for a speed of the turbine wheel with respect to a speed of the pump wheel of between 1.2 and 4;
   an input power of the pump wheel being constant or decreasing at rising turbine speed and constant pump speed;
   the pump outlet edge being positioned along a radius R, the turbine inlet edge being positioned along a radius r, and the ratio of the radius R to the radius r is between 2 and 8; and a radially extending shaft operably connected to the third guide blades and allowing for adjustment of the third guide blades.

16. A hydrodynamic converter having a rotational axis, the converter comprising:

a pump wheel having a pump outlet edge and allowing flow of a medium therethrough in a direction away from the rotational axis;

a turbine wheel in fluid communication with the pump wheel and allowing flow of the medium therethrough in a direction toward the rotational axis, the turbine wheel having a turbine inlet edge;

first guide blades positioned between the pump wheel and the turbine wheel along a flow-path of the medium;

second guide blades positioned between the turbine wheel and the pump wheel along the flow-path;

third guide blades positioned between the turbine wheel and the pump wheel along the flow-path, the third guide blades being adjustable;

a speed ratio for a speed of the turbine wheel with respect to a speed of the pump wheel of between 1.2 and 4;

an input power of the pump wheel being constant or decreasing at rising turbine speed and constant pump speed;

the pump outlet edge being positioned along a radius R, the turbine inlet edge being positioned along a radius r, and the ratio of the radius R to the radius r is between 2 and 8; and a radially extending shaft operably connected to the third guide blades and allowing for adjustment of the third guide blades, wherein the radially extending shaft is manipulatable from outside of the hydrodynamic converter.

17. A hydrodynamic converter having a rotational axis, the converter comprising:

a pump wheel having a pump outlet edge and allowing flow of a medium therethrough in a direction away from the rotational axis;

a turbine wheel in fluid communication with the pump wheel and allowing flow of the medium therethrough in a direction toward the rotational axis, the turbine wheel having a turbine inlet edge;

first guide blades positioned between the pump wheel and the turbine wheel along a flow-path of the medium;

second guide blades positioned between the turbine wheel and the pump wheel along the flow-path;

third guide blades positioned between the turbine wheel and the pump wheel along the flow-path, the third guide blades being adjustable a speed ratio for a speed of the turbine wheel with respect to a speed of the pump wheel of between 1.2 and 4;

an input power of the pump wheel being constant or decreasing at rising turbine speed and constant pump speed;

the pump outlet edge being positioned along a radius R, the turbine inlet edge being positioned along a radius r, and the ratio of the radius R to the radius r is between 2 and 8; and a radially extending shaft operably connected to the third guide blades and allowing for adjustment of the third guide blades, wherein the radially extending shaft is in driving connection with a drive shaft extending coaxially to the rotational axis of the hydrodynamic converter.

18. A method of delivering torque to a work machine comprising:

operably connecting a hydrodynamic converter having a rotational axis to the work machine;

flowing a medium through the hydrodynamic converter thereby passing the medium through a pump wheel in a direction away from the rotational axis and passing the medium through a turbine wheel in a direction toward the rotational axis;

operating the hydrodynamic converter with a speed ratio above 1 for a speed of the turbine wheel with respect to a speed of the pump wheel;

providing an input power of the pump wheel that is constant or decreasing at rising turbine speed and constant pump speed;

positioning a pump outlet at a distance R from the rotational axis and a turbine inlet at a distance r from the rotational axis, wherein the distance R is between 2 and 8 times the distance r.

19. The method of claim 18, further comprising:

positioning first guide blades between the pump wheel and the turbine wheel along a flow-path of the medium that is parallel to the rotational axis;

positioning second guide blades between the turbine wheel and the pump wheel along the flow-path that is parallel to the rotational axis; and operating the hydrodynamic converter with the speed ratio between 1.2 and 4.

* * * * *